(12) United States Patent
Swissa et al.

(10) Patent No.: US 10,488,938 B2
(45) Date of Patent: Nov. 26, 2019

(54) ADAPTIVE CURSOR TECHNOLOGY

(71) Applicant: Intel Corporation, Santa Clara, CA (US)

(72) Inventors: Ayelet Hashahar Swissa, Aminadav (IL); Maxim Schwartz, Mevaseret Zion (IL); Maoz Madmony, Beit-Kama (IL); Kfir Viente, Ramat-Gan (IL); Yaron Yanai, Modiin (IL)

( * ) Notice: Subject to any disclaimer, the term of this patent is extended or adjusted under 35 U.S.C. 154(b) by 68 days.

(21) Appl. No.: 15/639,813

(22) Filed: Jun. 30, 2017

(65) Prior Publication Data
US 2019/0004609 A1 Jan. 3, 2019

(51) Int. Cl.
G06F 3/01 (2006.01)
G06F 3/03 (2006.01)
G06T 7/70 (2017.01)
G06K 9/00 (2006.01)
G06F 3/0484 (2013.01)

(52) U.S. Cl.
CPC ............ *G06F 3/017* (2013.01); *G06F 3/0304* (2013.01); *G06F 3/04842* (2013.01); *G06K 9/00355* (2013.01); *G06T 7/70* (2017.01)

(58) Field of Classification Search
CPC .. G06F 3/017; G06F 3/04812; G06F 3/04883; G06F 3/005; G06F 3/011; G06F 3/0304; G06F 3/04815; G06F 3/04842; G06K 9/00355; G06T 13/40; G06T 17/00; G06T 19/006; G06T 2207/20; G06T 2207/20072; G06T 2207/20081; G06T 2207/30196; G06T 7/70
See application file for complete search history.

(56) References Cited

U.S. PATENT DOCUMENTS

| 7,365,735 | B2 * | 4/2008 | Reinhardt | G06F 1/1626 345/156 |
| 8,693,724 | B2 * | 4/2014 | Ahmed | G06F 3/017 345/156 |
| 8,854,433 | B1 * | 10/2014 | Rafii | G06F 3/017 348/42 |
| 9,477,303 | B2 | 10/2016 | Fleischmann et al. | |
| 2017/0185166 | A1 | 6/2017 | Madmony et al. | |
| 2017/0192515 | A1 | 7/2017 | Menadeva et al. | |

* cited by examiner

Primary Examiner — LaTanya Bibbins
(74) Attorney, Agent, or Firm — Jordan IP Law, LLC

(57) ABSTRACT

Systems, apparatuses and methods may track air gestures within a bounding box in a field of view (FOV) of a camera. Air gestures made within the bounding box may be translated and mapped to a display screen. Should the hand, or other member making the air gesture, exit the bounds of the bounding box, the box will be dragged along by the member to a new location within the FOV.

17 Claims, 5 Drawing Sheets

ADAPTIVE CURSOR TECHNOLOGY

TECHNICAL FIELD

Embodiments generally relate to the gesture mapping and, more particularly, to creating a bounding box in 3D space that can move locations as a user's hand (or other gesture part) begins to exit the box.

BACKGROUND

User interface gestures may include touch-based input gestures such as tapping, swiping, and otherwise manipulating a touch surface of a computing device. User interface gestures may also include input gestures made without physically touching the computing device, including moving the user's body, limbs, hands, or fingers to command user interface actions. Such movement-based input gestures are sometimes called perceptual or air gestures.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Embodiments are directed to a system and method of mapping a three-dimensional (3D) point of a tracked hand (or other gesture object), acquired by a tracking system to a two-dimensional (2D) point on the screen or monitor. According to embodiments, the user need not perform any calibration process and their hand movement will be responsive and behave with a similar amplitude of movement regardless of the distance from the camera.

When mapping a 3D coordinate in the image space into a 2D coordinate on the screen, the distance from the camera may be taken into account. If not, due to the nature of the camera's field-of-view (FOV), as the hand moves farther away the user may need to make larger physical movements in order to reach the screen edges.

Figure 1A:
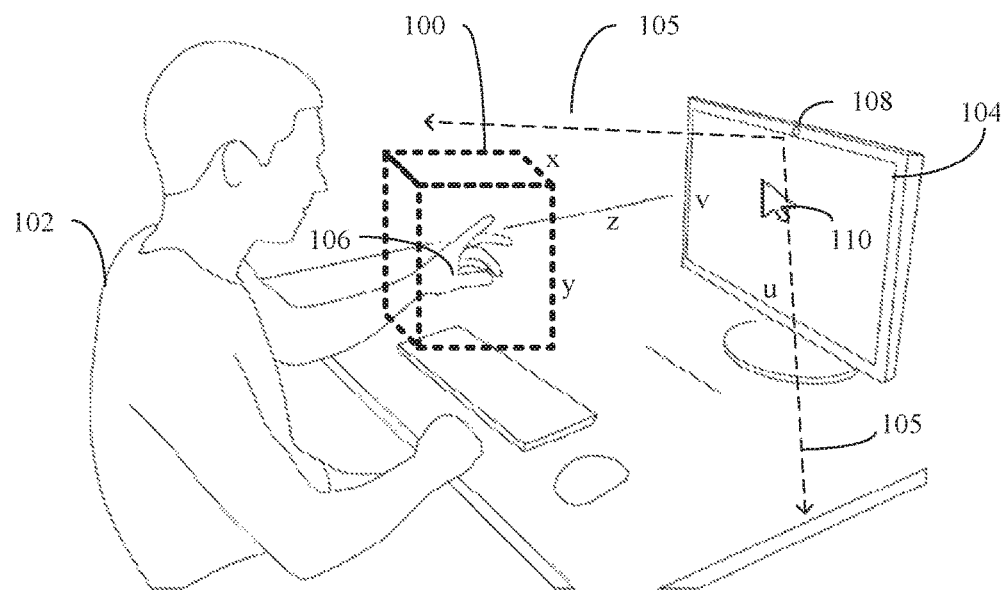
FIGS. 1A-1B are diagrams showing an example of an air gesture bounding box being dragged by a user when they go out of bounds according to one embodiment.

Referring now to FIG. 1A, a user 102 may interact with a video monitor or screen 104 using air gestures with, in this example, their hand 106. A camera 108 captures hand 106 movements within its FOV 105. The camera 108 may be a 3D depth camera, such are Intel's Realsense or may be a 2D camera with the appropriate software to calculate a depth point (z). For simplicity, the camera 108 is shown integrated with the monitor 104, but it may of course be located elsewhere.

One way to overcome the need to make larger physical movements as the hand 106 moves further away in the z-direction as set forth above may be to use 3D data from the camera 108 to define a constant 3D bounding box 100 in a FOV coordinate (x,y,z). A mapping from the FOV coordinate (x,y,z) to a monitor coordinate (u,v) may be done by calculating the position of the hand 104 with respect to the inside this bounding box 100. As such, the physical distance the hand 106 needs to move (x,y) to affect the same relative movement (u,v) on the monitor 104 may be substantially the same regardless of the distance z from the monitor 104.

The above approach has several challenges. First, it may be challenging to define such bounding box 100 without any information about the environment, such as the location of the user's head or shoulders. Without this information, it may be possible to predefine such box and have the user adjust to it. Alternatively, the user may perform a calibration process to create such a box 100. However, neither option supports a scenario in which the user changes their position (e.g. swivels in a chair or goes from sitting to standing).

Second, this bounding box 100 approach may be sensitive to jitter in the depth values. That is, a wrong depth value can change the location of the hand 106 in the FOV 105 coordinate and by this change the relative location of the hand inside the bounding box 100, even if the 2D points in the image space are very accurate.

Finally, the user 102 may be limited to the constant box and have to get the feel where it is in the FOV 105 since the system may lose the user's hand 106 once its goes out of the bounding box 100.

Figure 1B:
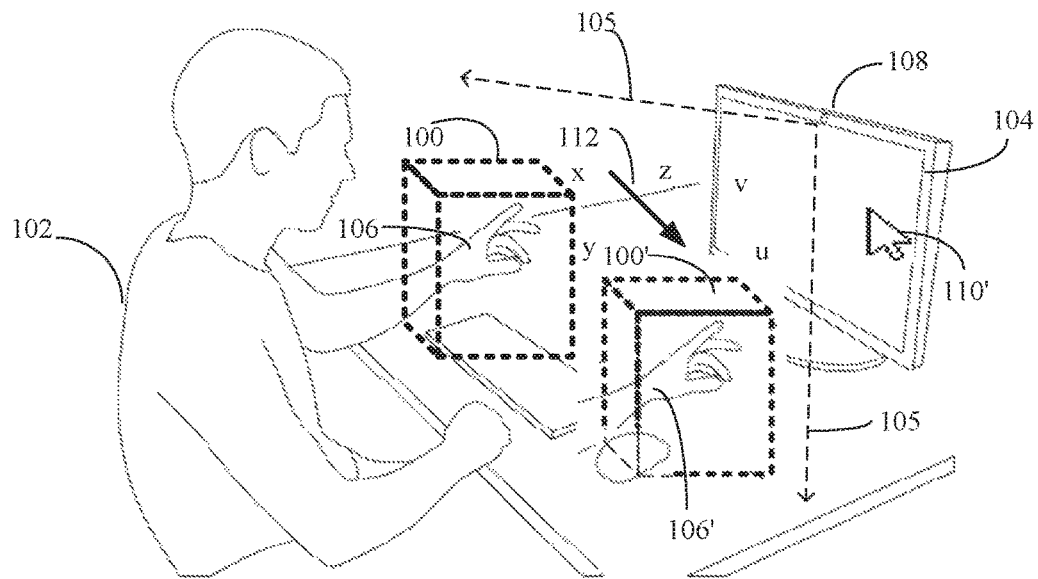

Referring now to FIG. 1B, according to an embodiment the bounding box 100 may be adaptive and be created around the hand 106 as it is entering the FOV 105. The adaptive bounding box 100 can change its location within the FOV 105 when the hand is about to exit the box 100. As shown, as the hand 106 enters the FOV 105 from the left a dynamic bounding box 100 is created. As the hand 106 moves in the x and y directions within the dynamic bounding box 100, these movements may be translated or mapped to v and u coordinates on the screen 108 as illustrated by cursor 110.

If the hand moves to either the x or y boundaries of the box 100 (i.e. the hand 105 is exiting the box 100) the box 100 may be move or be dragged in the direction of the hand 106. As illustrated in FIG. 1B, when the hand moves to the far right (maximum x) the gesture, illustrated as cursor 110' may be translated to the far right edge of the screen 104 (maximum u). As the hand 106' continues to move to the right in a positive x-direction, as illustrated by arrow 112, the adaptive bounding box 100' is dragged in that direction with the hand 106, while the cursor 110' remains frozen at the far right edge of the screen 104. If the hand 106' begins to move in a negative x direction the dynamic bounding box 100' remains stationary and the cursor 110' would begin to move to the left in a negative u direction.

Figure 2:
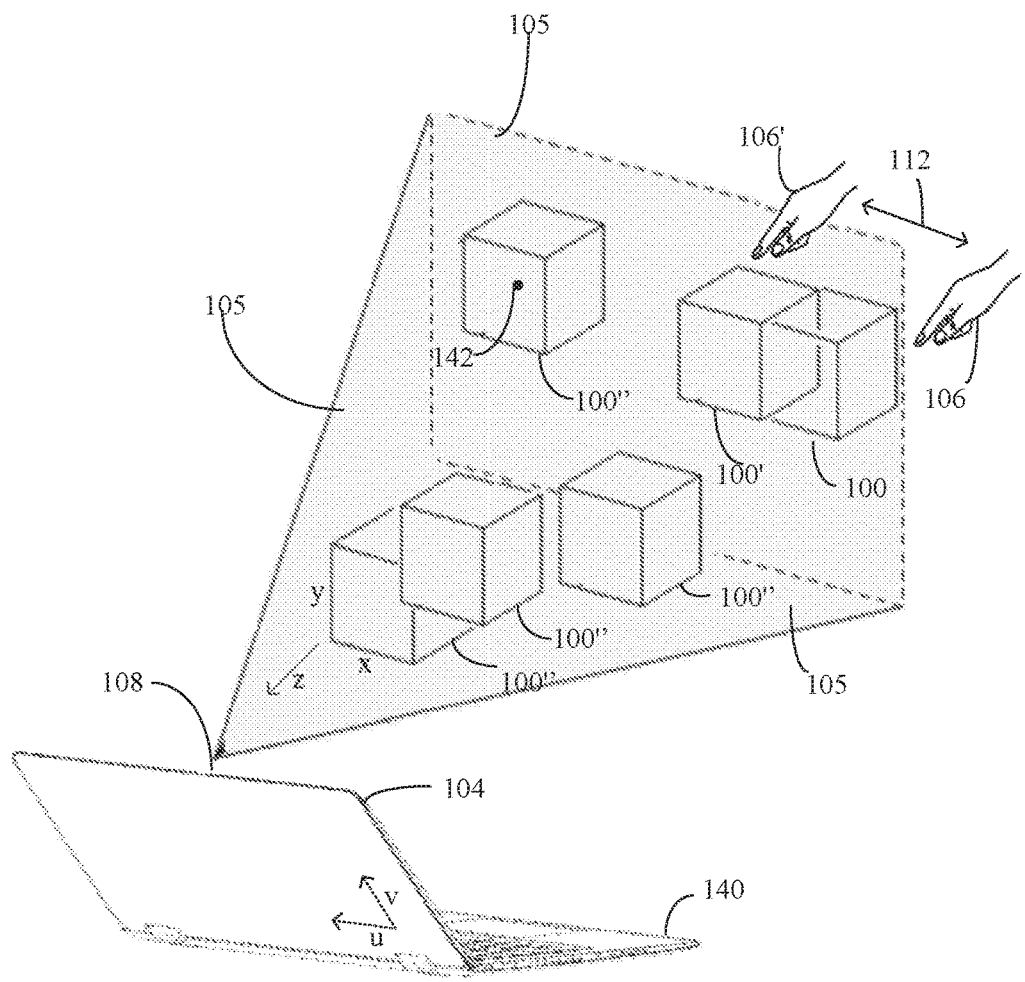
FIG. 2 is a diagram illustrating an example of an adjustable air gesture bounding box according to one embodiment.

Referring now to FIG. 2, another example is illustrated with a laptop 140 using the adaptive bounding box 100 used for air gestures. A front facing camera 108 may be located on the lid or other location on the laptop 140. The camera 108 will have some field of view (FOV) 105. As a hand 106 enters the FOV 105 a dynamic bounding box 100 may be created. When the system sees the hand 106 an FOV point 142 may be calculated with which to build the box 100 around. As the hand 106 moves within the box 100, the x and y coordinates in may be translated to a (u, v) coordinate on the laptop 140 screen 104. As the hand 106 moves to the to the far edge of the box 100 to new hand 106' position the bounding box 100' is dragged along the direction of arrow 112, to a new position by the hand 106'. As illustrated by multiple boxes 100", the box 100 may slide or be dragged along the (x, y, z) axis anywhere within the FOV 105.

While the adaptive bounding box 100 is shown as a cube of a particular size, it doesn't need to be a cube, but may be a rectangular box corresponding to the aspect ratio of the screen 104.

Figure 3:
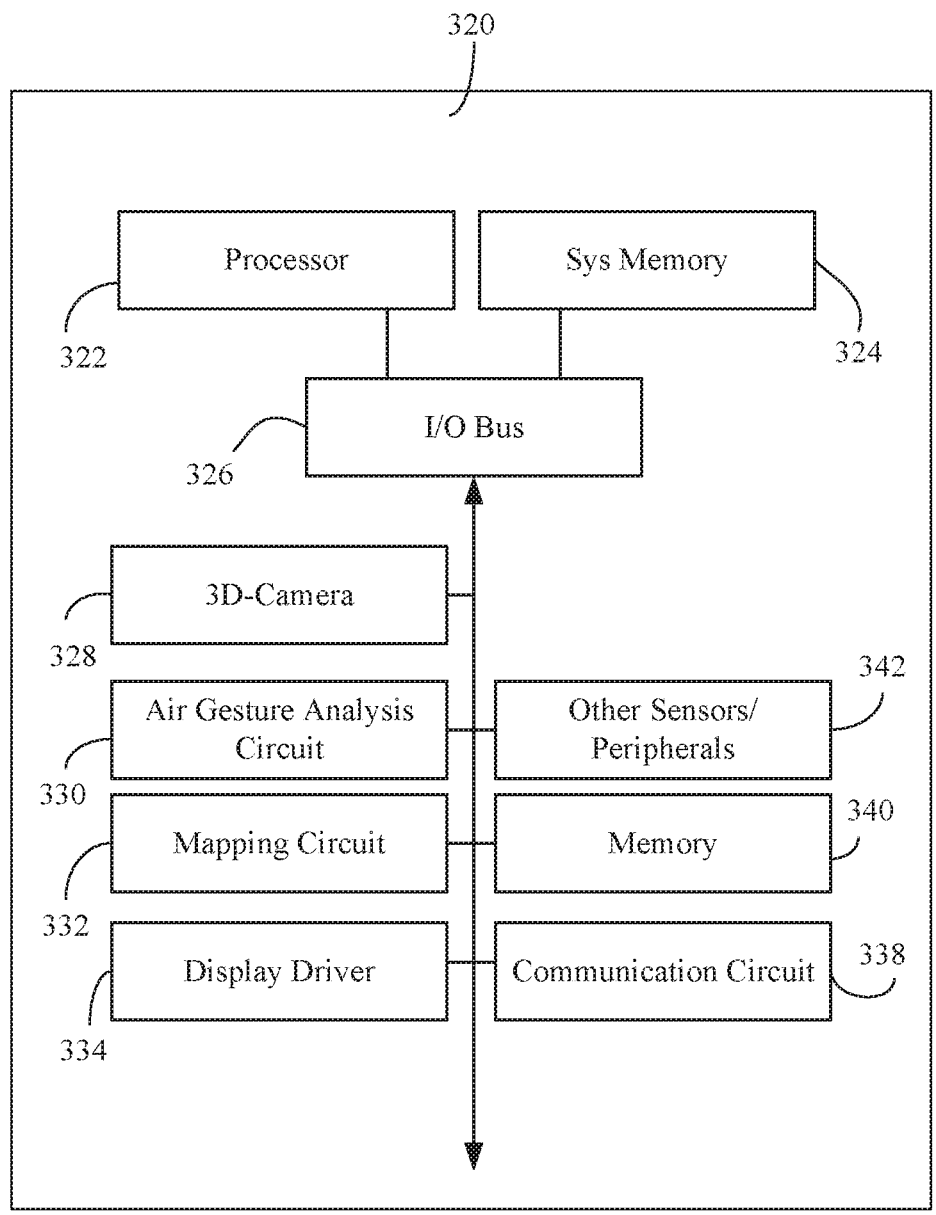
FIG. 3 is a block diagram illustrating one example of a computer system to carry out embodiments.

FIG. 3 shows an example block diagram of a computing system 320 to carry out embodiments. The system 320 may include a processor 322, a persistent system memory 324, and an Input/output (I/O) bus 326 connecting the processor 322 and memory 324 to other circuits in the system. These may include, a 3D camera 338 and associated software, an air gesture tracking circuit 330, display driver 334, a gesture mapping circuit 332, a communications circuit 338, a data storage memory circuit 340, as well as other sensors and peripherals 342.

Embodiments of each of the above system components may be implemented in hardware, software, or any suitable combination thereof. For example, hardware implementations may include configurable logic such as, for example, programmable logic arrays (PLAs), FPGAs, complex programmable logic devices (CPLDs), or in fixed-functionality logic hardware using circuit technology such as, for example, ASIC, complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

The 3D camera 328 may be an INTEL REALSENSE 3D camera. Additionally, in some embodiments, the camera 328 may be embodied as a 2D camera coupled with appropriate image processing software to generate a depth image based on one or more 2D images. The air gesture tracking/analysis circuit 330 may process motion information from the 3D camera 328 into gestures that allow the gesture mapping circuit 336 to translate the gestures from FOV space (x, y, z) into screen coordinates (u,v) as discussed above.

In examples, a hand 106 is used to illustrate air gesture tracking. In other embodiments, the motion of other body parts may be tracked. For example, head position, head velocity, head acceleration, head motion direction, eye velocity, eye acceleration, eye motion direction, object position, object velocity, object acceleration, object motion direction, etc. may be tracked.

Possible methods of tracking air gestures and mapping them to a position on a screen is described in FIGS. 4-7. For the sake of simplicity, embodiments may be described for a system performs hand tracking, but as previously mentioned, other objects capable of making gestures may be tracked. The same ideas may be applied to other technologies that perform frame to frame tracking on any other object.

The system input may be a 2.5d point which comprises a point in a 2D image that also has a depth value (z) describing the distance of the point from the camera. The system output may comprise a 2.5d (u, v, z) point where (u, v) describe the position in the monitor/image, and the (z) value describes the relative position of the hand in the z axis in an adaptive bounding box.

The bounding box is the dynamic area (in FOV space) where we expect the hand to perform its movement and gesture. The relative position of the hand in this bounding box describes the position of the adaptive point on the screen. The bounding box changes its location in FOV space whenever the hand goes out of the bounding box.

Thus, when the user gets to an edge of the bounding box the point is mapped to the edge of the screen. But, if the user will move its hand out of the bounding box the hand tracking isn't lost and the bounding box will move with the user's hand, while the user will keep seeing their point on the edge of the screen corresponding to the edge of the bounding box where the hand was exiting.

Figure 4:
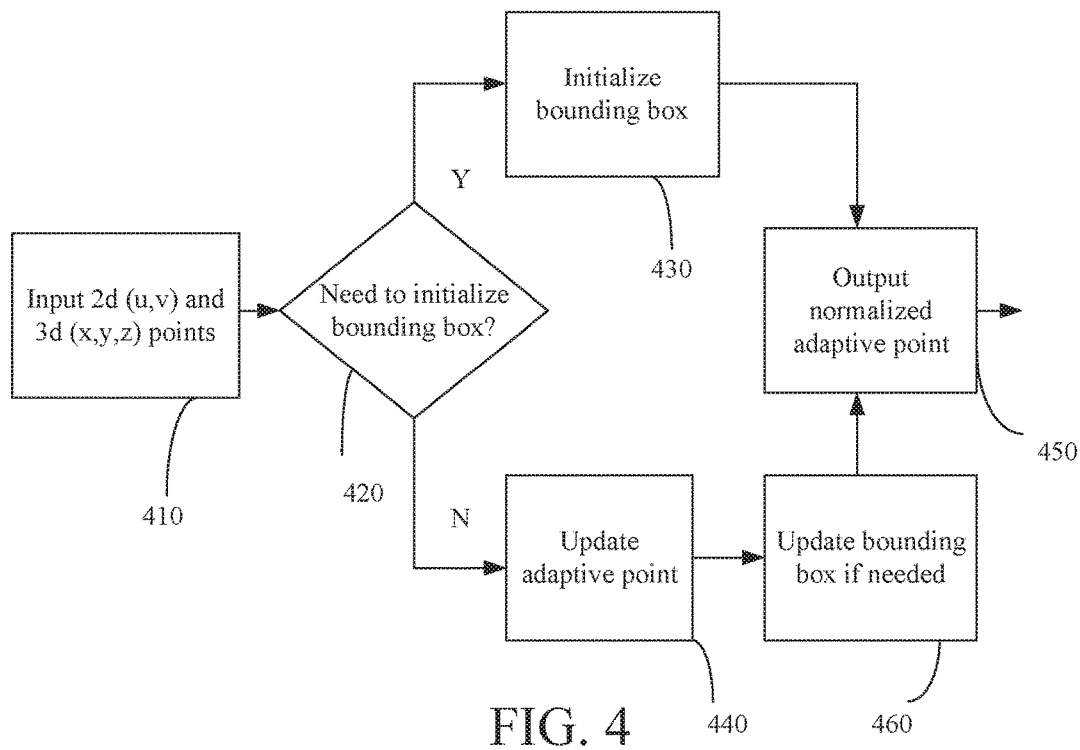
FIG. 4 is a flow diagram illustrating an example of a method of updating a bounding box to normalize an adaptive point according to an embodiment.

Referring now to FIG. 4, for each frame or a sampling of the frames captured in by the camera in the FOV, input the current adaptive point, which may be the 2D (u, v) cursor position on the screen, as well as determine the 3D (x, y, z) point of the hand in FOV space, at box 410. In box 420 it is determined if a bounding box needs to be initialized (i.e. initialization may be required when the hand initially enters the FOV). If the answer is yes, the bounding box is initialized at box 430. If not, the adaptive point of the screen is updated at box 440 to track hand movement within the bounding box. At box 460 the bounding box may be update to a new location if the hand is exiting in order to keep the hand within the bounding box. At box 450, a normalized adaptive point to be shown on the screen is output.

The normalized adaptive point is a normalized 3D point with values (x, y, z). Values are between [0-1], which is the relative position in the mapped coordinate system (e.g. screen/monitor). In order to convert the output point to the new coordinate system we need to consider its resolution. For example, mapping the adaptive point (x0.5, y0.5) to a monitor with resolution of (640×480) will be translated to (320,240).

In order to keep the interaction zone small and invariant to the distance of the hand from the camera, we may use a sliding 3D bounding box (100-100', as shown for example in FIG. 2). This box is in FOV coordinates and it determines the area that is currently being mapped.

The size of the bounding box can vary depending on the application nature and will be set by the developer at initialization to control sensitivity. A bigger bounding box equals smoother and more accurate interaction. Smaller bounding box equals minimal effort interaction with more sensitive to movements.

After initialization the adaptive bounding box size is constant, but moves around with the hand in the FOV space by sliding along all the axes (x, y and z). This coaxes the user to never cross the tracking bounds. Assuming the adaptive box is initially set inside the tracking bounds, the positions of the box in every axis change only if the hand has reached one of the box edges. When this happens, the adaptive point is mapped to the edges of the screen which encourages the user to return to the middle, thus avoiding the edges of the tracking bounds.

Figure 5:
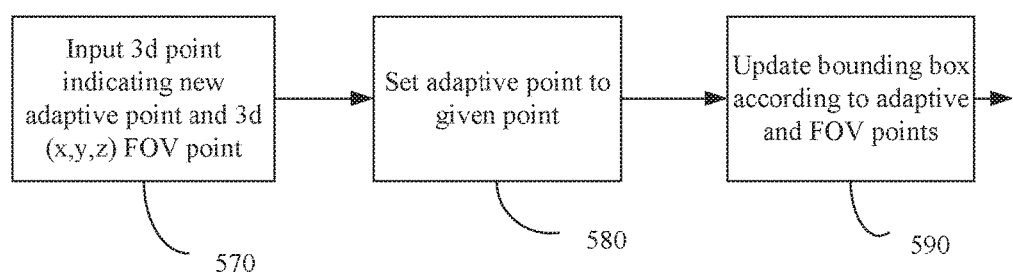
FIG. 5 is a flow diagram illustrating an example of a method of updating a bounding box according to adaptive points and FOV points according to an embodiment.

At any time throughout the process, the developer has the ability to reset the adaptive point and choose the position in which to reset it. Referring to FIG. 5, to reset the adaptive point, at box 570 the 3D point indicating a new adaptive point may be input as well as the 3D (x, y, z) FOV point. At box 580 the new adaptive point is set to the FOV point. At box 590, the bounding box may be updates according to the adaptive point and the FOV point. The significance of this may be that it allows the developer more control over the adaptive and enables various implementations such as setting the adaptive only after some kind of engagement, or setting the adaptive point to begin in the middle of the screen.

Figure 6:
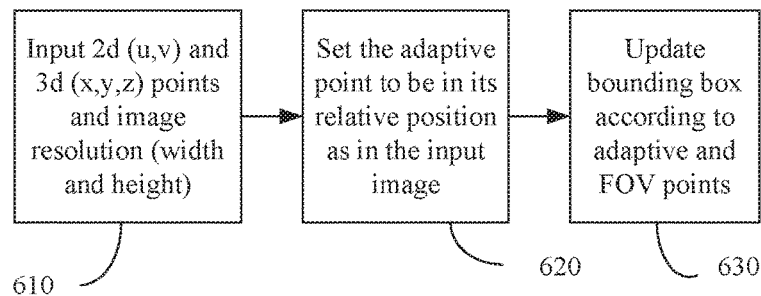
FIG. 6. is a flow diagram illustrating an example of a method of initializing a bounding box according to an embodiment.

Referring now to FIG. 6 for initialization of the bounding box, at box 610 the adaptive 2D (u, v) point and 3D (x, y, z) FOV point are determined as well as the screen or imager resolution (width and height) is input. At box 620 the adaptive point is set to be in its relative position as the input image. At box 630 the bounding box may be updated according to the adaptive point and FOV points. Update bounding box (given adaptive point and FOV position). For example, the bounding box may be determined so that FOV point is in the same relative position in the bounding box as the adaptive point in the range [0-1] For example, if the FOV point is (0 0) and the adaptive point is (0 5, 0.5) and the bounding box size is (width, height=0.4 meter) then the bounding box will be top left=(−0.2-0.2) bottom right=(0.2, 0.2).

Figure 7:
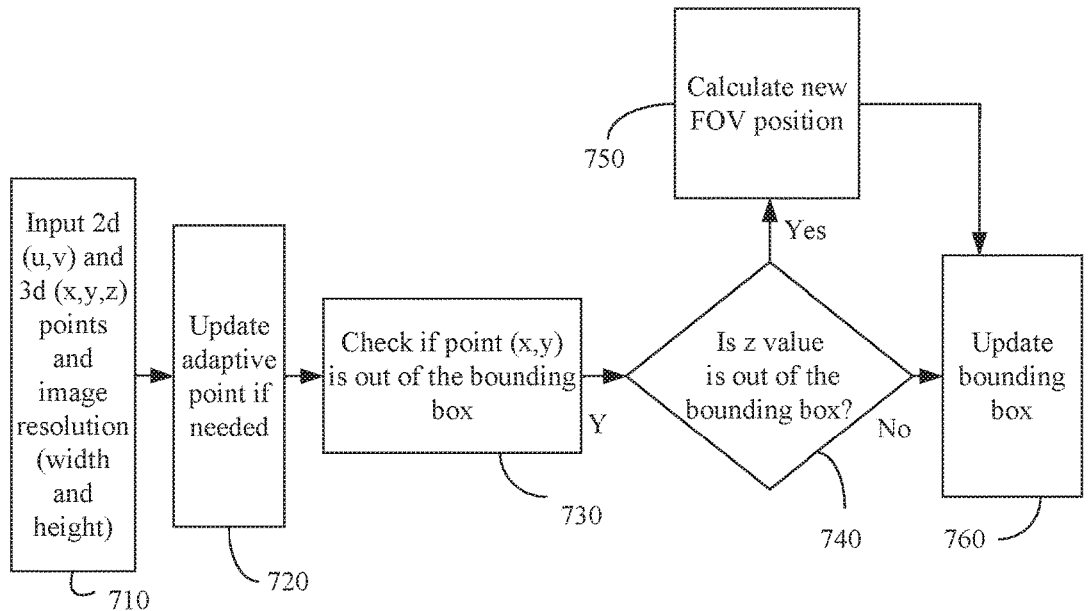
FIG. 7 is a flow diagram illustrating an example of a method of updating a bounding box should a gesture go out of bounds according to an embodiment.

Referring now to FIG. 7, there is shown one way to update the adaptive point and the bounding box. At box 710 adaptive 2D (u, v) point and 3D (x, y, z) FOV point are determined as well as the screen or imager resolution (width and height) is input. At box 720 the adaptive point is updates in needed. At decision boxes 730 and 740, if either the FOV point (x. y) or (z) are out of bounds, a new FOV position is determined at box 750. Thereafter the bounding box may be updated as shown at box 760.

In order to find the adaptive point we need to calculate the position of the input point in FOV space (pntFOV) and then calculate the relative position of pntFOV in the adaptive bounding box. The calculations may be done as follows (only after bounding box is initialized):

1. Create Auxiliary point pntAux(U,V,Z-front) where U,V are the coordinate in the image space and Z-front is the distance of the closest edge of the bounding box from the camera.

2. Un-project pntAux to the world space and get pntWorldAux(X,Y,Z-front).

3 Create new point, pntFOV (X, Y, Z-input).

4. Calculate the relative position of pntFOV in the adaptive bounding box.

The system to map the tracked point into another coordinate system (e.g. monitor), conducts the following:

1. Initialization (FIG. 4)—At the first time the initialization phase is done:

a. Determine the new adaptive point, this point is set to the same relative 2D position as in the input image. For example, if the input image resolution is 100×100 and the input point is (50, 50) the adaptive point will be (0.5, 0.5).

b. Un-project the input point into its world coordinate (pntFOV).

c. Set the bounding box according to the new adaptive point and pntFOV.

2 Update adaptive point (720)—In the case where the pntFOV is in the bounding box boundaries in one axis or more. The adaptive point in that axis is set to the relative position of the pntFOV in the bounding box. In the case where pntFOV is out of box bounds in a certain axis, the adaptive point value in that axis would be frozen.

3. Update pntFOV point (750)—In the case where the pntFOV is out of the box boundaries in the Z coordinate (When the z coordinate changes, this effects the X&Y coordinates a well). Re-calculate pntFOV by unprojecting from the image space to the FOV space while using the value Z-closest=(Zim−Zadapt*Zim). This way, when the bounding box is calculated again, it would match the change in Z and thus allow the adaptive point to continuous.

4. Update bounding box—(760) this phase is done whenever the pntFOV is out of the box boundaries in at least one of the coordinates Update the bounding box given the adaptive point and the pntFOV that were calculated in 2, 3.

If the adaptive point is reset throughout the calculations, the new adaptive point is saved and the calculations continue as is FIG. 4.

Some solutions use either the whole FOV or a fixed bounding box to determine the dynamic area where the user hand will be active for air gestures. In these solutions the user may be limited in the hand tracking area or they have to do big motions in order to cover the whole screen, user also needs some visual feedback to know if he is in the right place for hand tracking.

Embodiments easily mapping the tracked point in FOV space into another coordinate system on the screen. It is robust and invariant to the scale and the distance of the tracked object from the camera inside the FOV. Thus, the same motion size is mapped to the screen if the z-distance is 50 cm or at 100 cm. Further, by using an adaptive bounding box, we do not enforce the user to interact within a certain area in front of the camera, but we allow him to acquire a smooth and accurate mapping while entering the FOV and changing his location inside of it. In addition, using the mechanism of un-projecting the 2.5d point into world coordinates using the minimum Z value of the bounding box stabilized the whole system.

ADDITIONAL NOTES AND EXAMPLES

Example 1 may include an apparatus to control a cursor with an air gesture comprising, a processor communicatively connected to a persistent memory, a display communicatively connected to the processor, a camera, to have a field of view (FOV) to capture an image of an air gesture, communicatively connected to the processor, an air gesture analysis circuit to define a draggable bounding box within the FOV, the size of a movable bounding box being constant regardless of a distance z the bounding box is from the camera.

Example 2 may include the apparatus as recited in example 1, wherein the draggable bounding box to drag along with the image of the air gesture to keep the air gesture within the bounding box.

Example 3 may include the apparatus as recited in example 2, further comprising a mapping circuit to map an (x, y, z) coordinate within the bounding box to a (u, v) coordinate on the display.

Example 4 may include the apparatus as recited in example 3 wherein the bounding box to be initialized as the air gesture enters the FOV.

Example 5 may include the apparatus as recited in example 3 wherein the camera comprises a 3D camera.

Example 6 may include the apparatus as recited in example 3 wherein the comprises a 2D camera with circuitry to determine a depth (z) coordinate.

Example 7 may include the apparatus as recited in example 3 wherein the mapping circuit to place a cursor at the (u, v) coordinate on the display.

Example 8 may include a method of controlling a cursor with an air gesture, comprising, capturing a gesture in a field of view (FOV) of a camera, defining a bounding box around the gesture image, the bounding box having (x, y, z) coordinates where x comprises width, y comprises height, and z comprises a distance from the camera, mapping the (x, y) coordinates to a (u, v) coordinate on a screen and placing a cursor, and dragging the bounding box along with the gesture should the gesture begin to exit the bounding box.

Example 9 may include the method as recited in example 8, further comprising freezing the cursor at the (u, v) coordinate at an edge of the screen when dragging the bounding box.

Example 10 may include the method as recited in example 9 further comprising, creating the bounding box when the gesture enters the FOV.

Example 11 may include the method as recited in example 8 wherein the bounding box remains a constant size regardless of the z coordinate.

Example 12 the method as recited in example 9 further comprising, allowing the user to adjust sensitivity by selecting the initial size of the bounding box.

Example 13 may include the method as recited in example 9 wherein the gesture comprises an air gesture made by a hand.

Example 14 may include a system to control a cursor with an air gesture, comprising, a processor communicatively connected to a persistent memory, a display communicatively connected to the processor, a camera, to have a field of view (FOV) to capture an image of an air gesture, communicatively connected to the processor, an air gesture analysis circuit to define a draggable bounding box within the FOV, the size of a movable bounding box being constant regardless of a distance z the bounding box is from the camera, and a mapping circuit to map an (x, y, z) coordinate within the bounding box to a (u, v) coordinate on the display and positioning a cursor.

Example 15 may include the system as recited in example 14, wherein the draggable bounding box to drag along with the image of the air gesture to keep the air gesture within the bounding box.

Example 16 may include the system of example 14 wherein the cursor is frozen the (u, v) coordinate at an edge of the display when dragging the bounding box.

Example 17 may include at least one computer readable storage medium comprising a set of instructions which, when executed by a computing device, cause the computing device to perform the steps of as recited in examples 8-13.

Example 18 may include an apparatus to control a cursor with an air gesture, comprising, means for capturing a gesture in a field of view (FOV) of a camera, means for defining a bounding box around the gesture image, the bounding box having (x, y, z) coordinates where x comprises width, y comprises height, and z comprises a distance from the camera, means for mapping the (x, y) coordinates to a (u, v) coordinate on a screen and placing a cursor, and means for dragging the bounding box along with the gesture should the gesture begin to exit the bounding box.

Example 19 may include the apparatus as recited in example 18, further comprising freezing the cursor at the (u, v) coordinate at an edge of the screen when dragging the bounding box.

Example 20 may include the apparatus as recited in example 19 further comprising, means for creating the bounding box when the gesture enters the FOV.

Example 21 may include the method as recited in example 18 wherein the bounding box remains a constant size regardless of the z coordinate.

Example 22 may include the apparatus as recited in example 19 further comprising, means for allowing the user to adjust sensitivity by selecting the initial size of the bounding box.

Example 23 may include the apparatus as recited in example 19 wherein the gesture comprises an air gesture made by a hand.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
    a processor communicatively connected to a persistent memory;
    a display communicatively connected to the processor;
    a camera, to have a field of view (FOV) to capture an image of an air gesture, communicatively connected to the processor;
    an air gesture analysis circuit to define a draggable bounding box within the FOV, the size of a draggable bounding box being constant regardless of a distance z the draggable bounding box is from the camera,
    wherein the draggable bounding box to drag along with the image of the air gesture to keep the air gesture within the draggable bounding box.

2. The apparatus as recited in claim 1, further comprising a mapping circuit to map an (x, y) coordinate within the draggable bounding box to a (u, v) coordinate on the display.

3. The apparatus as recited in claim 2 wherein the draggable bounding box to be initialized as the air gesture enters the FOV.

4. The apparatus as recited in claim 2 wherein the camera comprises a 3D camera.

5. The apparatus as recited in claim 2 wherein the camera comprises a 2D camera with circuitry to determine a depth (z) coordinate.

6. The apparatus as recited in claim 2 wherein the mapping circuit to place a cursor at the (u, v) coordinate on the display.

7. A method, comprising:
    capturing a gesture image in a field of view (FOV) of a camera;
    defining a bounding box around the gesture image, the bounding box having (x, y, z) coordinates where x comprises width, y comprises height, and z comprises a distance from the camera;
    mapping the (x, y) coordinates to a (u, v) coordinate on a screen and placing a cursor; and
    dragging the bounding box along with the gesture image should the gesture image begin to exit the bounding box, wherein the bounding box remains a constant size regardless of the z coordinate.

8. The method as recited in claim 7, further comprising freezing the cursor at the (u, v) coordinate at an edge of the screen when dragging the bounding box.

9. The method as recited in claim 8 further comprising: creating the bounding box when the gesture enters the FOV.

10. The method as recited in claim 8 further comprising: allowing a user to adjust sensitivity by selecting an initial size of the bounding box.

11. The method as recited in claim 8 wherein the gesture comprises an air gesture made by a hand.

12. A system, comprising:
    a processor communicatively connected to a persistent memory;
    a display communicatively connected to the processor;
    a camera, to have a field of view (FOV) to capture an image of an air gesture, communicatively connected to the processor;
    an air gesture analysis circuit to define a draggable bounding box within the FOV, the size of a draggable bounding box being constant regardless of a distance z the draggable bounding box is from the camera, wherein the draggable bounding box to drag along with the image of the air gesture to keep the air gesture within the draggable bounding box; and
    a mapping circuit to map an (x, y) coordinate within the draggable bounding box to a (u, v) coordinate on the display and positioning a cursor.

13. The system of claim 12 wherein the cursor is frozen the (u, v) coordinate at an edge of the display when dragging the draggable bounding box.

14. At least one non-transitory computer readable storage medium comprising a set of instructions which, when executed by a computing device, cause the computing device to perform the steps of:
    capturing a gesture image in a field of view of a camera;
    defining a bounding box around the gesture image, the bounding box having (x, y, z) coordinates where x comprises width, y comprises height, and z comprises a distance from the camera;
    mapping the (x, y) coordinates to a (u, v) coordinate on a screen and placing a cursor; and
    dragging the bounding box along with the gesture image should the gesture image begin to exit the bounding box, wherein the bounding box remains a constant size regardless of the z coordinate.

15. The medium as recited in claim 14, further comprising freezing the cursor at the (u, v) coordinate at an edge of the screen when dragging the bounding box.

16. The medium as recited in claim 14 further comprising: creating the bounding box when the gesture image enters the FOV.

17. The medium as recited in claim 14 further comprising: adjusting sensitivity by selecting an initial size of the bounding box.

* * * * *